No. 789,498. PATENTED MAY 9, 1905.
C. JOHNSON.
FERTILIZER DISTRIBUTER.
APPLICATION FILED MAY 2, 1904.

5 SHEETS—SHEET 3.

Witnesses:
Inventor:
Charles Johnson
By E. Laass, Attorney

No. 789,498. PATENTED MAY 9, 1905.
C. JOHNSON.
FERTILIZER DISTRIBUTER.
APPLICATION FILED MAY 2, 1904.

5 SHEETS—SHEET 4.

WITNESSES:
INVENTOR
Charles Johnson
By E. Laass
ATTORNEY.

No. 789,498. PATENTED MAY 9, 1905.
C. JOHNSON.
FERTILIZER DISTRIBUTER.
APPLICATION FILED MAY 2, 1904.

5 SHEETS—SHEET 5.

Witnesses:
C. H. Fulmer.
J. J. Laass

Inventor:
Charles Johnson
By E. Laass, Atty.

No. 789,498. Patented May 9, 1905.

UNITED STATES PATENT OFFICE.

CHARLES JOHNSON, OF CORTLAND, NEW YORK, ASSIGNOR, BY MESNE ASSIGNMENTS, TO GEORGE H. GARRISON AND CHARLES M. DE VANY, OF CORTLAND, NEW YORK.

FERTILIZER-DISTRIBUTER.

SPECIFICATION forming part of Letters Patent No. 789,498, dated May 9, 1905.

Application filed May 2, 1904. Serial No. 205,882.

*To all whom it may concern:*

Be it known that I, CHARLES JOHNSON, of Cortland, in the county of Cortland, in the State of New York, have invented new and useful Improvements in Fertilizer-Distributers, of which the following, taken in connection with the accompanying drawings, is a full, clear, and exact description.

This invention relates to the class of fertilizer-distributers which carry the fertilizer upon a traveling endless apron constituting the bottom of the wagon-body and conveying the fertilizer gradually to the rear end of the body where a rotary beater casts the fertilizer from the wagon and distributes it over the ground.

My invention pertains especially to the mechanisms for transmitting motion to the aforesaid endless apron.

The object of the invention is to provide mechanisms which shall be efficient in operation and adjustable to vary the speed of the travel of the apron and produce a continuous motion in each of the different speeds of transmission and also permit said transmission to be quickly arrested while the wagon is in motion; and to that end the invention consists in the improved construction and combination of the component parts of the aforesaid mechanism, as hereinafter described, and summed up in the annexed claims.

Figure 1:
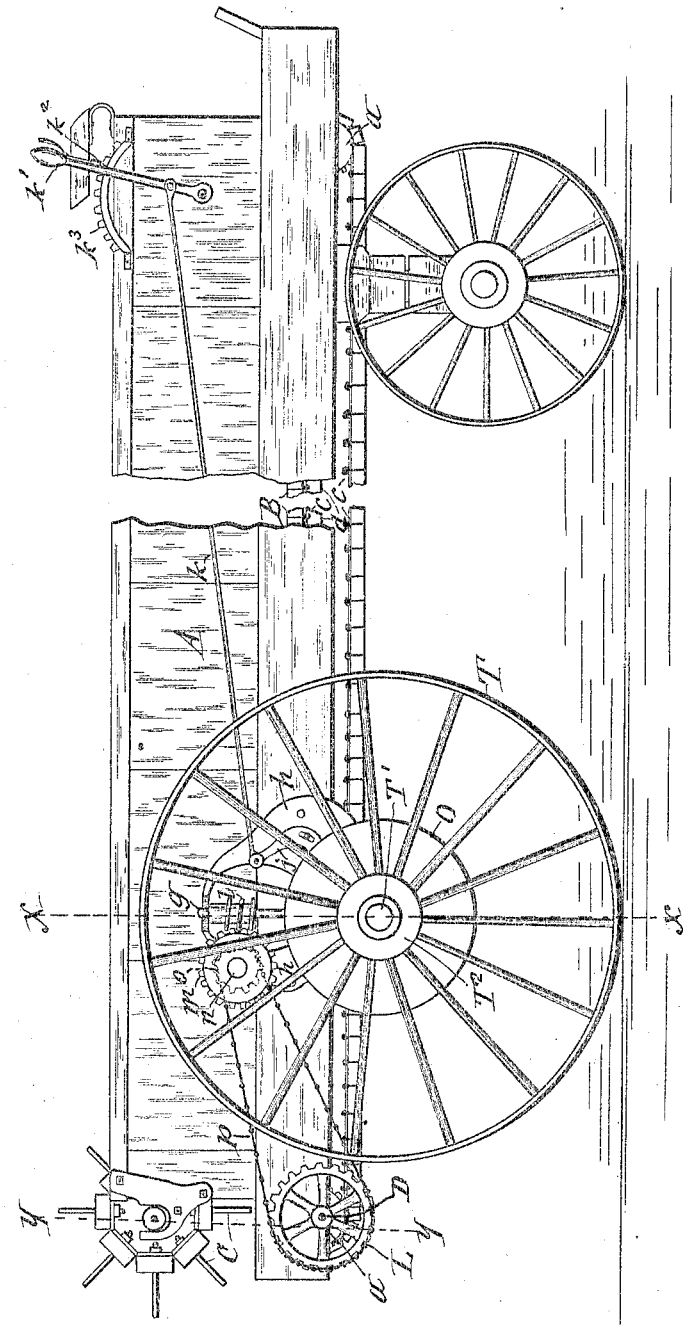
Figure 2:
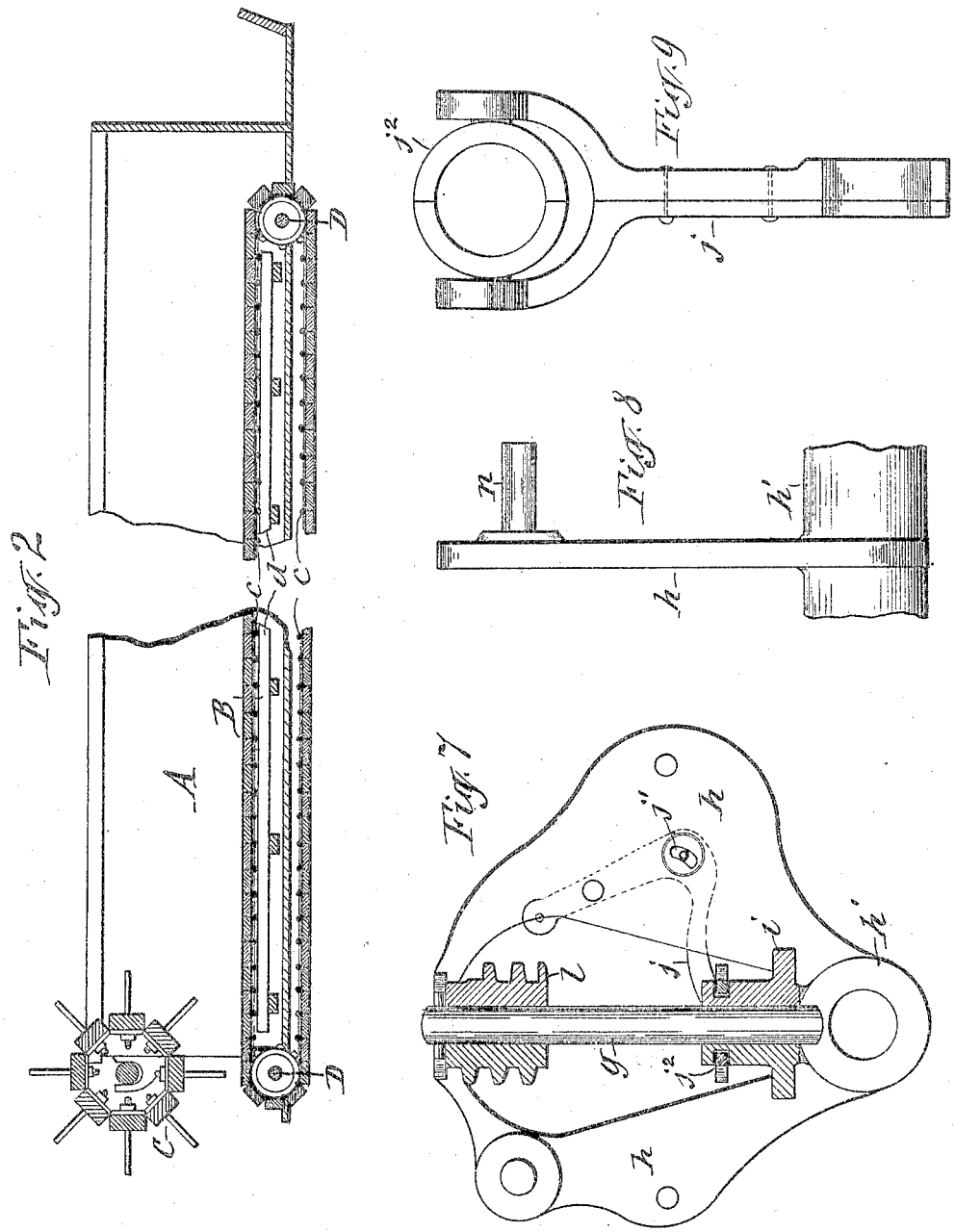
Figure 3:
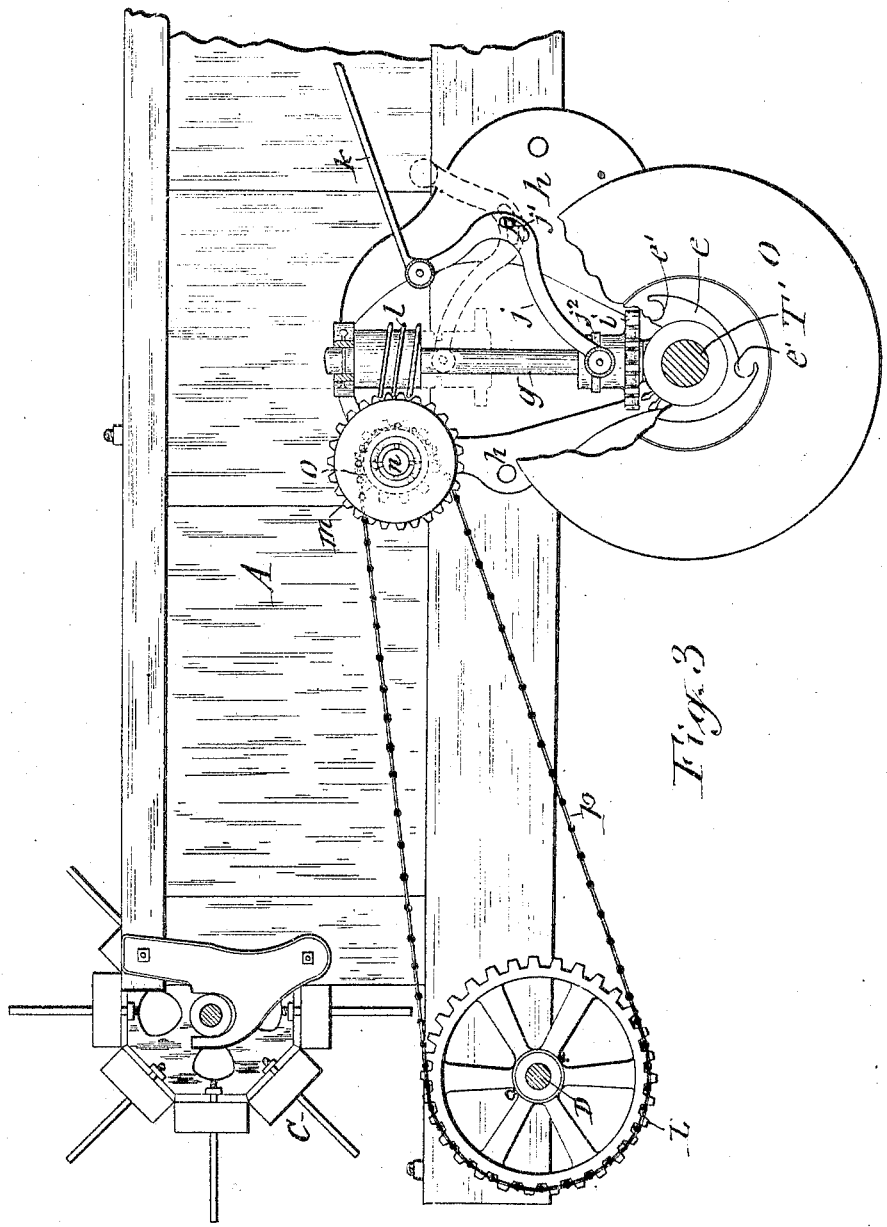
Figure 4:
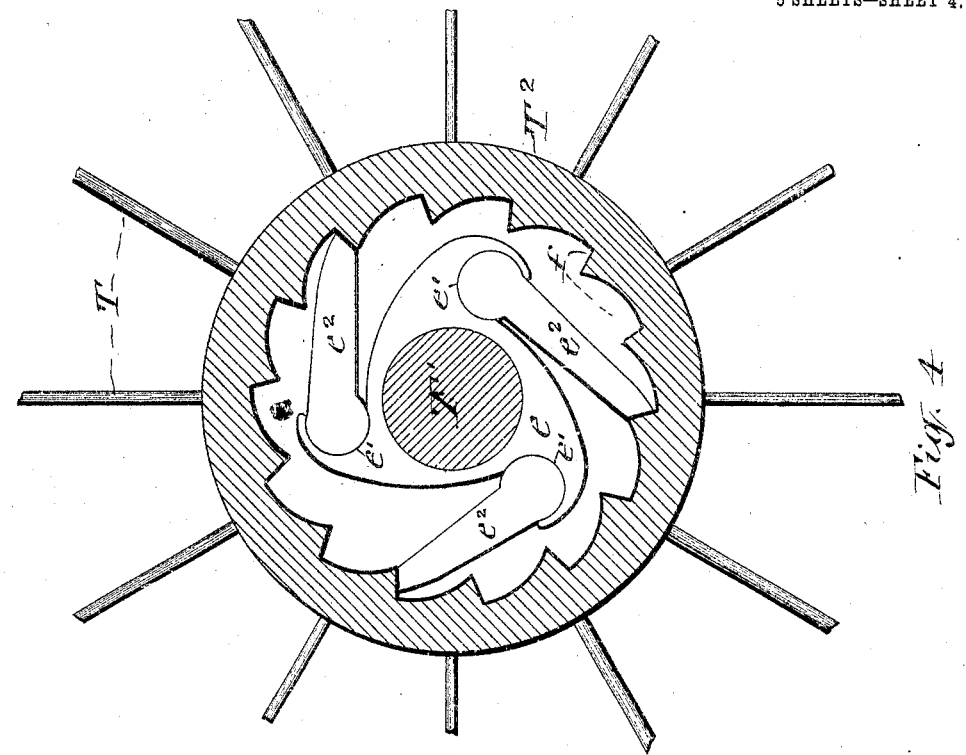
Figure 5:
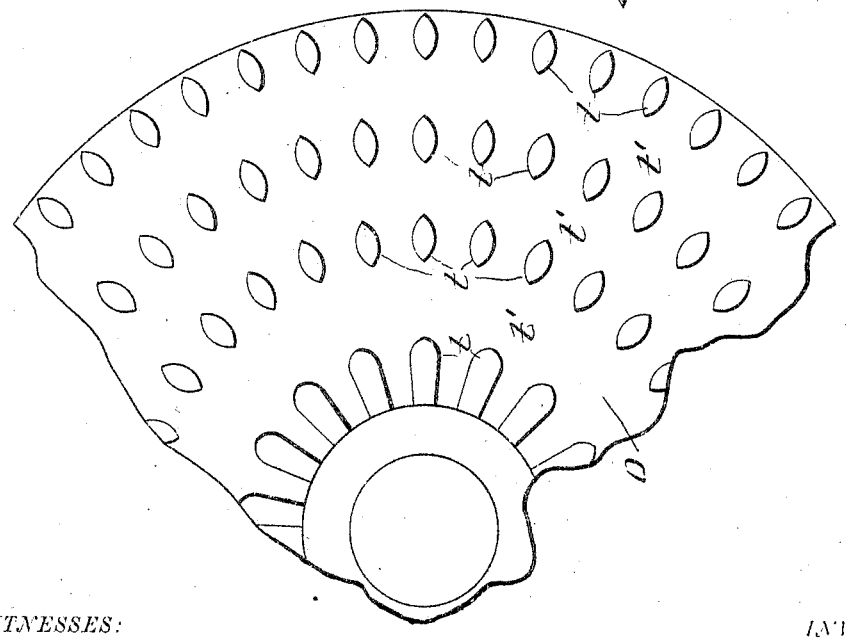
Figure 6:
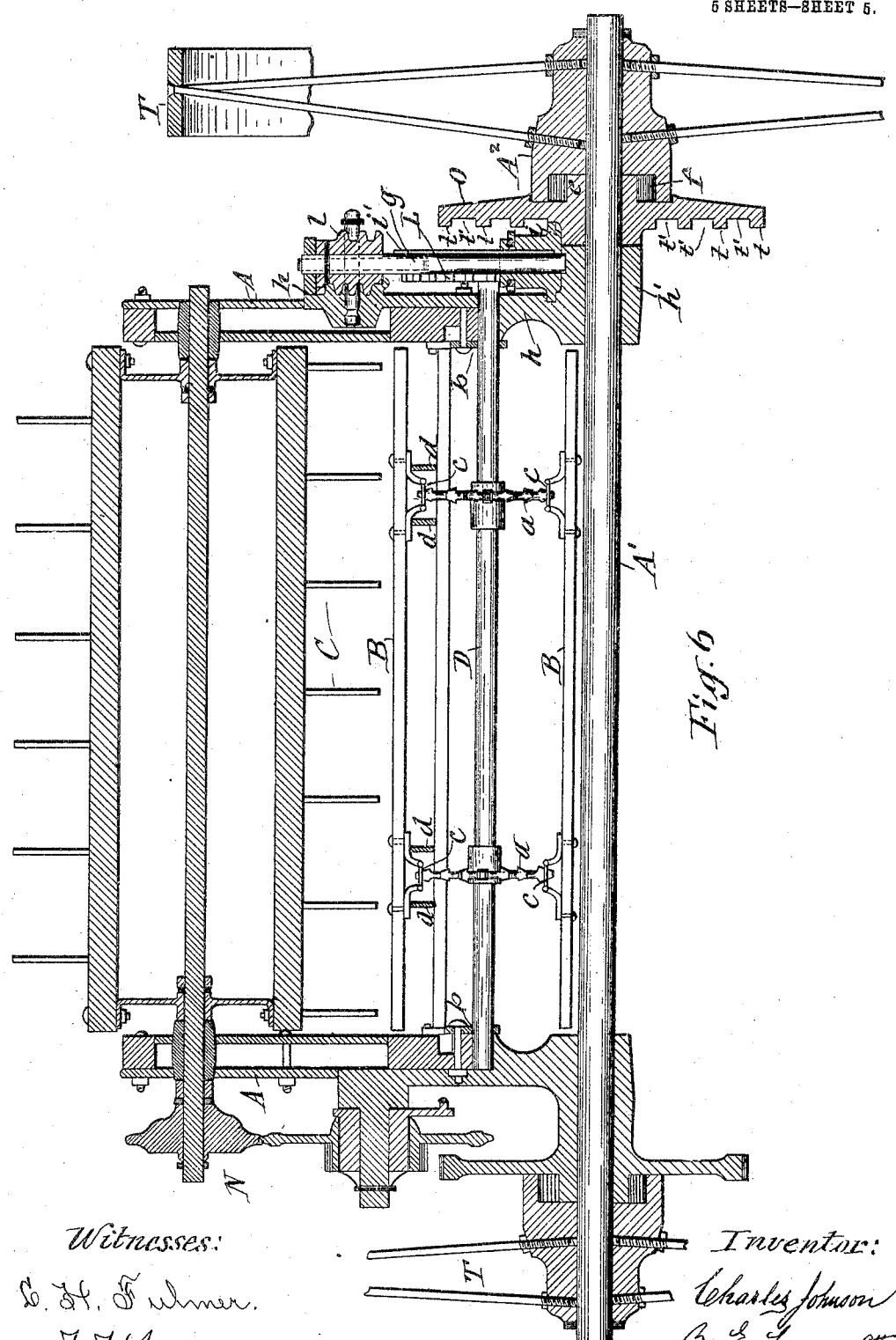

In the accompanying drawings, constituting part of this application, Figure 1 is a side view of a fertilizer-distributer embodying my improvements. Fig. 2 is a central longitudinal section of the same minus the wheels of the vehicle. Fig. 3 is an enlarged side view minus the traction-wheel. Fig. 4 is a further enlarged transverse sectional view of the inner end portion of the wheel-hub viewed toward the outer end of the hub and showing the pawl-and-ratchet mechanism which drives the mechanism for transmitting motion to the endless apron of the vehicle. Fig. 5 is a fragmentary view of the toothed face of the rotary disk. Fig. 6 is an enlarged vertical transverse section taken at the traction-wheels and viewed rearward therefrom and partly on lines $x$ $x$ and $y$ $y$ in Fig. 1. Fig. 7 is a detached face view of the bracket which supports the mechanism on the vehicle-body. Fig. 8 is an edge view of said bracket, and Fig. 9 is a plan view of the manually-controlled lever which is connected to the adjustable pinion.

Similar letters of reference indicate corresponding parts.

A denotes the body or box of the vehicle on which the fertilizer is transported. T represents one of the rear traction-wheels of said vehicle.

B represents the longitudinally-traveling endless apron which constitutes the bottom of the body A and carries the fertilizer gradually to the rear end of the vehicle-body, from whence it is distributed over the ground by means of the usual revolving beater C, which is actuated by variously-constructed mechanism N, the detail of which is immaterial to my present invention, and therefore a description thereof is omitted in the present case. My present invention pertains to the mechanisms for transmitting motion to the endless apron B, which mechanisms consist of the following construction and combination of its component parts, to wit: The carrying portion of the apron B is supported throughout the length of the body A by means of longitudinal tracks $d$ $d$, secured to the ends of the body. At each end of the body A is a transverse shaft D, journaled in suitable bearings $b$ $b$, attached to the sides of the body. On each of these shafts are mounted sprocket-wheels $a$ $a$, engaging the chains $c$ $c$, to which are attached the slats of the apron B. The rear wheels $a$ are rigidly secured to their shaft to transmit motion to said apron, as hereinafter described. To the end of the rear shaft D is fastened an additional sprocket-wheel L, which receives rotary motion from the traction-wheel T by instrumentality of the following mechanisms: The axle T' of the traction-wheels T may be secured either revolubly or stationary on the body A. In either case the traction-wheels are mounted loose on the axle. Adjacent to the inner end of the hub T² of one of said traction-wheels is a revoluble disk O, supported on the axle. The outer side of the disk has projecting from it a rigid spider e, formed with sockets e' e' e', in which are pivotally supported suitably-shaped dogs e² e² e², as more clearly shown in Fig. 4 of the drawings. The interior of the inner end portion of the wheel-hub T² is provided with a rigid annular ratchet f, which becomes engaged with the dogs e² e² e² during the forward movement of the vehicle, and thus imparts rotary motion to the disk O. The inner face of the said disk has projecting from it a plurality of concentric annular rows of teeth t t, which are disposed with annular blank paths t' t', between the rows of teeth, as shown in Fig. 5 of the drawings. g represents a shaft which extends radially across the toothed side of the disk O and is pivoted at its ends in stationary bearings which are preferably secured to a suitable bracket h, fastened to the side of the vehicle-body A, and formed with a sleeve h', embracing the axle T', so as to assist in sustaining said axle in its position. On the shaft g is mounted a pinion i, which is movable lengthwise thereof and locked circumferentially thereon by means of a spline i'', projecting from the shaft and passing through a coinciding groove in the pinion, which is adapted to engage the teeth t of the disk, so as to receive rotary motion therefrom. By shifting the pinion lengthwise on the shaft g, so as to engage different rows of said teeth, the motion of the pinion is varied to a higher or lower speed, as may be desired. j represents a manually-controlled lever which is pivoted intermediate its ends, as indicated at j'', to the bracket h and has one arm bifurcated, as shown in Fig. 9 of the drawings, and connected to trunnions on semicircular sections of a ring j², which is seated in a circumferential groove in the exterior of the pinion-hub. The opposite end of the lever j has connected to it a rod k, which extends to the front end portion of the body A, where it is connected to a hand-lever k', pivoted to the body. By means of this lever the operator riding on the seat s on the front portion of the body can shift the pinion i to engage the row of teeth t, required to impart the desired speed to the pinion. A dog k², connected to the lever k' and engaging the usual rack k³, serves to hold said lever in its adjustment. l represents a worm which is fastened to the upper end portion of the shaft g and engages a worm-gear m, pivoted on a gudgeon n, which projects from the exterior of the bracket. The inner face of the worm-gear m is formed with a sprocket-pinion o, which by means of a chain p is connected with the sprocket-wheel L on the end of the shaft D, hereinbefore described.

The transmission of motion to the apron can be quickly arrested when desired by simply shifting the pinion i to a position opposite one of the blank paths t' on the disk O.

It will be noted that by the employment of the concentric rows of teeth t t on the rotary disk O, I obtain a continuous motion of the apron in each of its adjusted speeds.

When the axle T' is arranged revoluble on the body A, as hereinbefore stated, the disk O is preferably fastened to the said axle.

Having described my invention, what I claim is—

1. The combination, with the fertilizer-vehicle, transverse shafts disposed at opposite ends of the vehicle-body, and the endless apron carried by said transverse shafts, of a rotary disk actuated by the traction-wheel, a revoluble shaft extending radially across the said disk and journaled in stationary bearings, a pinion mounted on said shaft movable lengthwise and locked circumferentially thereon and receiving rotary motion from the disk, means for shifting the pinion on its shaft, a sprocket-wheel receiving motion from the pinion-shaft, a sprocket-wheel attached to the rear transverse shaft and a sprocket-chain connecting said wheels.

2. The combination, with the fertilizer-vehicle, transverse shafts disposed at opposite ends of the vehicle-body, and the endless apron carried by said shafts, of a rotary disk actuated by the traction-wheel and provided with concentric rows of teeth and with annular blank paths between the rows of teeth, a revoluble shaft extending radially across the disk and sustained in stationary bearings, a pinion mounted on said radial shaft movable lengthwise and locked circumferentially thereon to either engage different rows of teeth or remain in the blank path of the disk, a sprocket-wheel receiving motion from said radial shaft, a sprocket-wheel attached to the rear transverse shaft, and a sprocket-chain connecting said wheels.

3. The combination with the fertilizer-vehicle, transverse shafts, and the endless apron carried by said shafts, of a rotary disk actuated by the traction-wheel and provided with a plurality of concentric rows of teeth on its side, a bracket fastened to the vehicle-body, a shaft disposed radially across the disk and journaled in the said bracket, a pinion mounted on said shaft movable lengthwise thereof to engage different rows of the aforesaid teeth, a spline-and-groove connection between said pinion and shaft, a lever pivoted to the aforesaid bracket and connected to the movable pinion, means for operating said lever, and mechanism transmitting motion from said radial shaft to the aforesaid apron.

4. The combination, with the fertilizer-vehicle and transverse shafts carrying the endless apron, of a rotary disk actuated by the traction-wheel and provided with a plurality of concentric rows of teeth on its side and with a blank annular path between each pair of rows of teeth, a bracket fastened to the vehicle-body, a shaft disposed radially across the disk and journaled at its ends in stationary bearings in the said bracket, a pinion mounted on said shaft movable lengthwise thereof to engage different rows of teeth and shiftable to the intermediate blank path, a spline-and-groove connection between said pinion and shaft, a sprocket-wheel actuated by the aforesaid pinion, a sprocket-wheel attached to one of the apron-carrying shafts, and a sprocket-chain connecting said sprocket-wheels as set forth.

5. The combination, with the fertilizer-vehicle and the endless apron, of a bracket fastened to the vehicle-body and formed with a sleeve embracing the axle of the traction-wheel, a disk mounted on said axle adjacent to the inner end of the hub of the traction-wheel and receiving motion from said traction-wheel, a plurality of concentric annular rows of teeth projecting from the side of the disk, a shaft disposed radially across said disk and journaled in the aforesaid bracket, a pinion mounted on the radial shaft and movable lengthwise thereof to engage different rows of the aforesaid teeth, a spline-and-groove connection between said pinion and shaft, a worm fastened to said shaft, a gear engaging said worm, and mechanism transmitting motion from said gear to the endless apron.

6. The combination, with the fertilizer-vehicle, transverse shafts, wheels on said shafts, and the endless apron carried on said wheels, a bracket fastened to the vehicle-body and formed with a sleeve receiving through it the axle of the traction-wheel, a disk mounted on said axle, a pawl-and-ratchet mechanism transmitting motion from the traction-wheel to the disk, a plurality of concentric rows of teeth projecting from the side of the disk, blank annular paths between the rows of teeth, a shaft disposed radially across said disk and journaled at its ends in the aforesaid bracket, a pinion mounted on the radial shaft movable lengthwise thereof to engage different rows of the aforesaid teeth and shiftable to the intermediate blank paths, a spline-and-groove connection between the pinion and shaft, a manually-controlled lever disposed to shift the pinion on its shaft, a worm attached to said shaft, a gear engaging said worm, a sprocket-wheel rotating with said gear, a sprocket-wheel attached to one of the aforesaid transverse shafts, and a chain connecting the said two sprocket-wheels as set forth.

CHARLES JOHNSON. [L. S.]

Witnesses:
W. J. ELSOM,
C. M. DE VANY.